United States Patent

[11] 3,616,875

[72] Inventor Neil M. Lottridge
 Saginaw, Mich.
[21] Appl. No. 866,908
[22] Filed Oct. 16, 1969
[45] Patented Nov. 2, 1971
[73] Assignee General Motors Corporation
 Detroit, Mich.

[54] DISC BRAKE CALIPER MOUNTING ARRANGEMENT
 1 Claim, 4 Drawing Figs.

[52] U.S. Cl.................................................. 188/73.3,
 188/73.4
[51] Int. Cl.................................................. F16d 65/04,
 F16d 55/10
[50] Field of Search....................................188/73.3–73.5

[56] References Cited
UNITED STATES PATENTS
3,035,664  5/1962  Desvignes et al. ............ 188/73.3 X
3,166,158  1/1965  Burnett et al. ................. 188/73.4
3,326,332  6/1967  Hayes............................ 188/73.3 X
3,330,385  7/1967  Swift ............................. 188/73.4
3,365,028  1/1968  Hajek............................ 188/73.3
3,387,687  6/1968  Eggstein et al................ 188/73.3 X FOREIGN PATENTS
1,506,592  11/1967  France ......................... 188/73.4
1,065,267  4/1967   Great Britain................ 188/73.3

Primary Examiner—Duane A. Reger
Attorneys—W. E. Finken and D. D. McGraw

ABSTRACT: A sliding brake caliper for a disc brake is mounted by means of a tongue-and-groove arrangement between the arcuately spaced ends of a nonrotatable mounting bracket so that the caliper is retained against movement radially and arcuately relative to the disc, while permitting sliding movement transversely of the disc to maintain caliper adjustment. An antirattle and antifriction plastic shim arrangement is provided between the caliper housing and the mounting bracket surfaces.

PATENTED NOV 2 1971 3,616,875
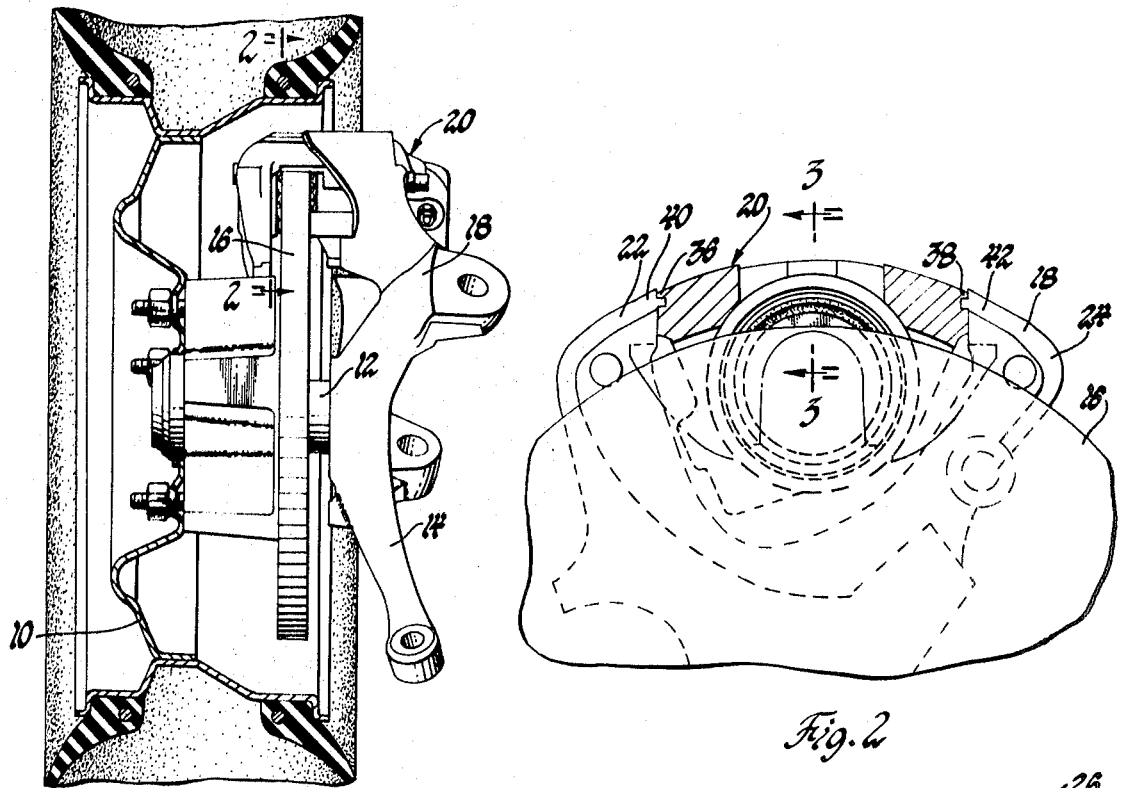
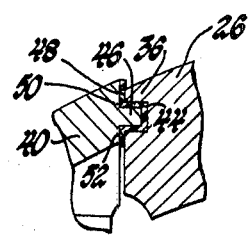
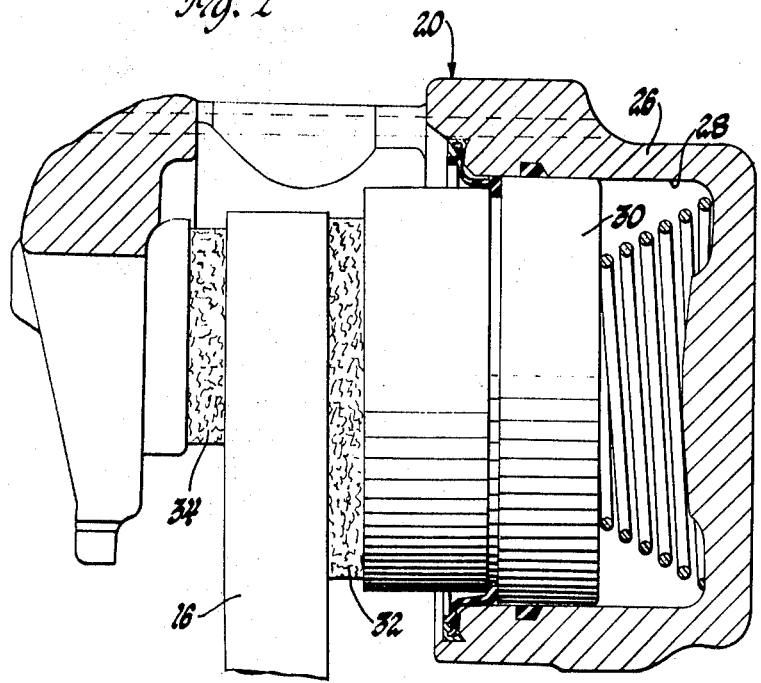
INVENTOR.
Neil M. Lottridge
BY
D. D. McGraw
ATTORNEY

DISC BRAKE CALIPER MOUNTING ARRANGEMENT

The invention relates to a disc brake assembly and more particularly to one in which a slidable caliper is mounted on a support bracket without the use of ears and pins. The ear and pin arrangement commonly provided on disc brake assemblies in current production use is replaced with a tongue-and-groove arrangement. This reduces the number of parts required and provides a simpler and less expensive caliper housing casting. The construction is readily adaptable to the manufacture of the support bracket as a part of the integral steering knuckle casting. Alternately, the mounting bracket may be formed of sheet metal.

IN THE DRAWING:

FIG. 1 is a cross section view of a vehicle wheel brake assembly embodying the invention.

FIG. 2 is a partial section view of the brake assembly of FIG. 1 taken in the direction of arrows 2—2 of that figure.

FIG. 3 is a cross section view of the brake caliper assembly, taken in the direction of arrows 3—3 of FIG. 2.

FIG. 4 is a fragmentary cross section view enlarged to show details of the caliper mounting, as seen in FIG. 2.

The vehicle wheel 10 is suitably mounted for rotation on the stub axle 12 of the steering knuckle assembly 14 of a front vehicle wheel suspension system. The brake disc 16 is suitably attached to the wheel 10 so that it is rotatable therewith. The steering knuckle assembly 14 has a mounting bracket 18 integrally formed therewith and providing the mounting for the brake caliper assembly 20. The mounting bracket 18 includes arms 22 and 24 which are positioned adjacent the disc 16 and are arcuately spaced relative to the disc so as to receive the caliper assembly 20.

The caliper assembly 20 is illustrated as being of the single piston sliding caliper type. Thus, the caliper housing 26 is provided with a cylinder 28 on one side of the disc 16, and a piston 30 mounted in the cylinder and acting on friction pad 32 to engage the pad in braking relation with one side of disc 16. The housing 26 extends transversely across the periphery of the disc 16 and then radially adjacent the disc to provide a mounting for another friction pad 34 which engages the other side of disc 16 in braking relation. The details of the specific caliper-actuating mechanism form no part of the invention and may be readily modified as desired.

The caliper housing 26 has leading and trailing ends 36 and 38 which are provided with end surfaces respectively cooperating with the ends 40 and 42 of the mounting bracket ends 22 and 24. FIG. 4 shows in greater detail the interrelated structure of one of the caliper ends with its mounting bracket arm end. The caliper end 36 and the brake arm end 40 are shaped to provide a tongue-and-groove arrangement.

In the particular construction illustrated, the caliper housing is provided with a groove 44 and the bracket arm is provided with a complementary tongue 46. The abutting end surfaces 48 and 50, respectively formed on the housing 26 and the arm 40 adjacent their respective groove-and-tongue constructions, provide brake force transmitting surfaces. Therefore, the brake force exerted on the caliper assembly 20 is transmitted to the mounting bracket and then to the steering knuckle assembly 14.

In its preferred form, the mounting arrangement includes a shim 52 between the caliper housing end 36 and the bracket arm end 40, with a similar shim being provided between ends 38 and 42. Shim 52 is preferably made of an antifriction material and also has antirattle characteristics. The shim permits direct metal-to-metal contact between the caliper housing and the mounting bracket, thus absorbing relative movements therebetween in radial and arcuate directions so that noises that might otherwise occur are greatly reduced or eliminated. Plastic shims of this type also provide excellent anticorrosive characteristics so that the caliper assembly remains more freely slidable transversely of the disc 16 than might otherwise be the case.

A disc brake assembly embodying the invention provides a simple and effective mounting for a sliding caliper, the mounting preventing caliper movement radially and arcuately of the disc to be braked while permitting transverse caliper movement required to maintain the assembly in adjustment. The sliding arrangement is effective not only to allow for brake friction pad wear, but also adjusts to movement of the disc relative to the mounting bracket during severe cornering. The caliper may slide on its tongue-and-groove mounting, and is retained in place by virtue of its position on the disc 16, so that no transverse retention means need be provided.

What is claimed is:

1. In a disc brake assembly having a rotatable member to be braked and a caliper assembly for selectively braking the rotatable member and a nonrotatable mounting bracket on which the caliper assembly is mounted adjacent the rotatable member, a caliper assembly mounting arrangement in which said caliper assembly includes a housing positioned transversely of the rotatable member and having leading and trailing end surfaces, said mounting bracket being positioned adjacent the rotatable member to be braked and having a pair of arms having end surfaces arcuately spaced in a plane adjacent said rotatable member, said caliper housing end surfaces and said mounting bracket arm end surfaces including complementary caliper mounting and guiding surfaces provided with at least one tongue and at least one groove, said tongue-and-groove being in mating relation, and extending transversely of said rotatable member for preventing movement of said caliper assembly radially and arcuately relative to said rotatable member while permitting transverse movement of said caliper assembly relative to said rotatable member, and brake torque transmitting surfaces separate from but contiguous with said tongue and groove and formed on said mounting bracket arm end surfaces and said caliper housing end surfaces adjacent said tongue and groove and in operative abutting engagement for transmitting braking force between said caliper assembly and said mounting bracket.

* * * * *